May 19, 1953
H. W. SCHROEDER
2,638,715
GREENHOUSE BENCH STRUCTURE
Filed Aug. 17, 1948
3 Sheets-Sheet 1
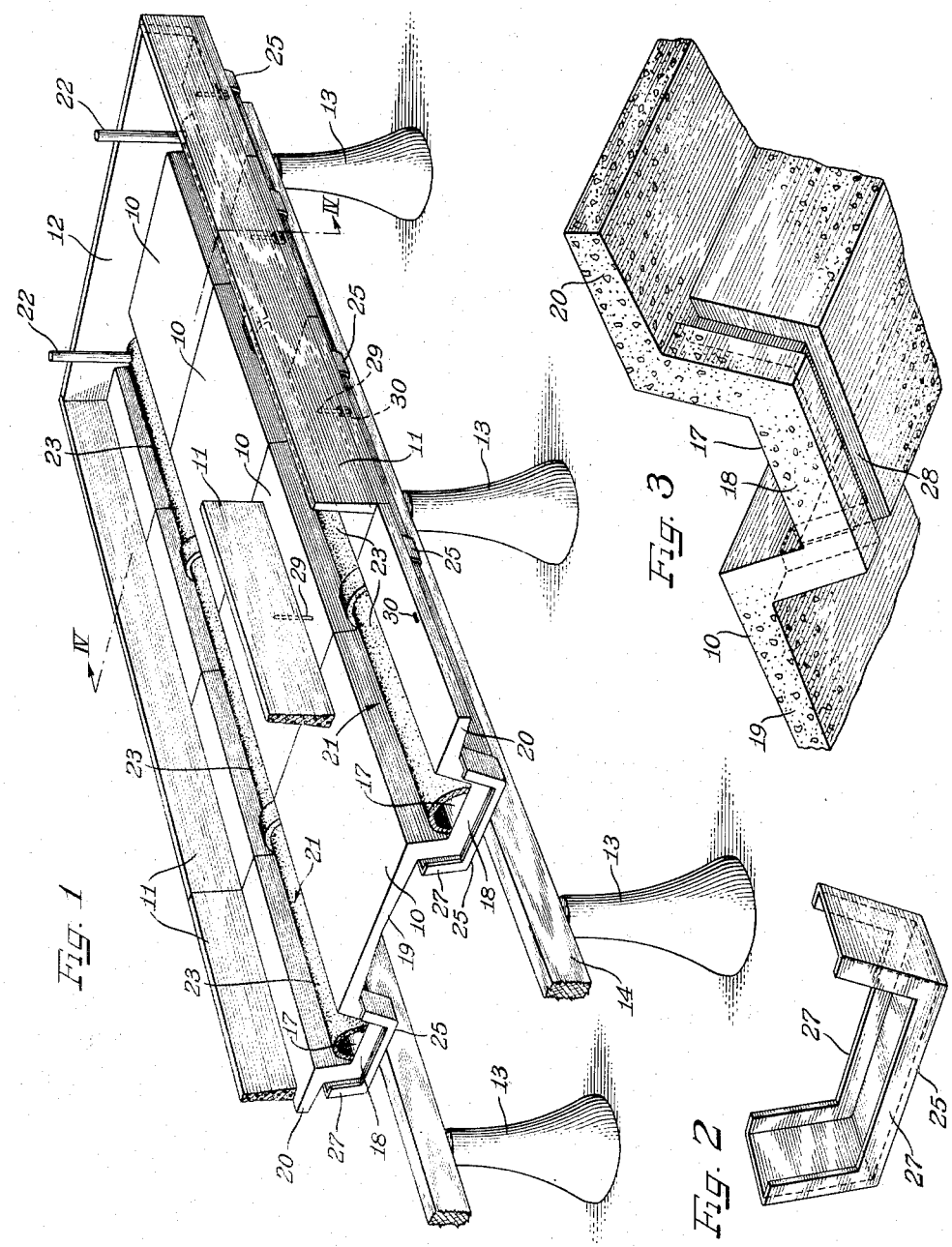
Inventor
Herbert W. Schroeder
by
Attys

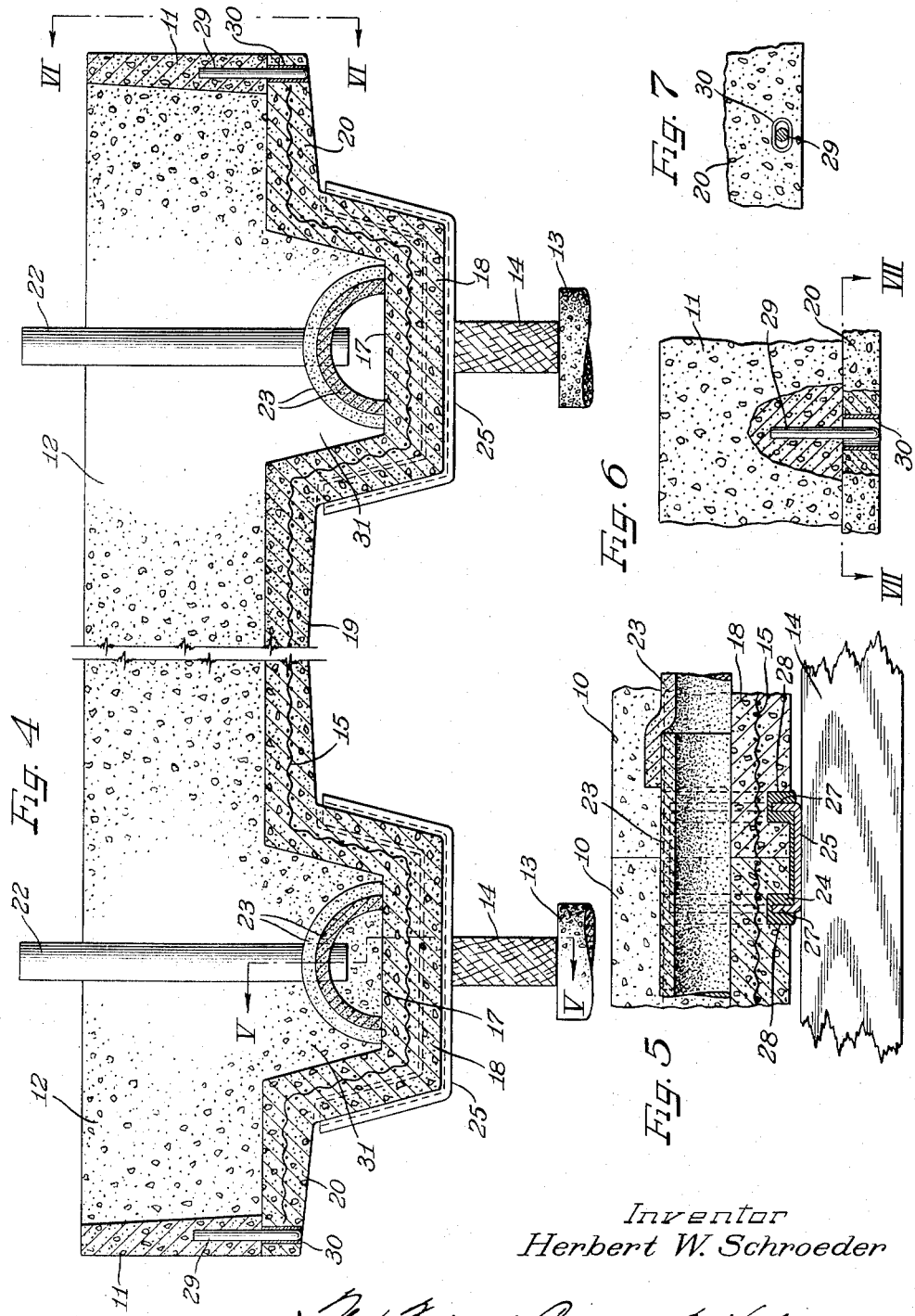

May 19, 1953      H. W. SCHROEDER      2,638,715
GREENHOUSE BENCH STRUCTURE
Filed Aug. 17, 1948      3 Sheets-Sheet 3
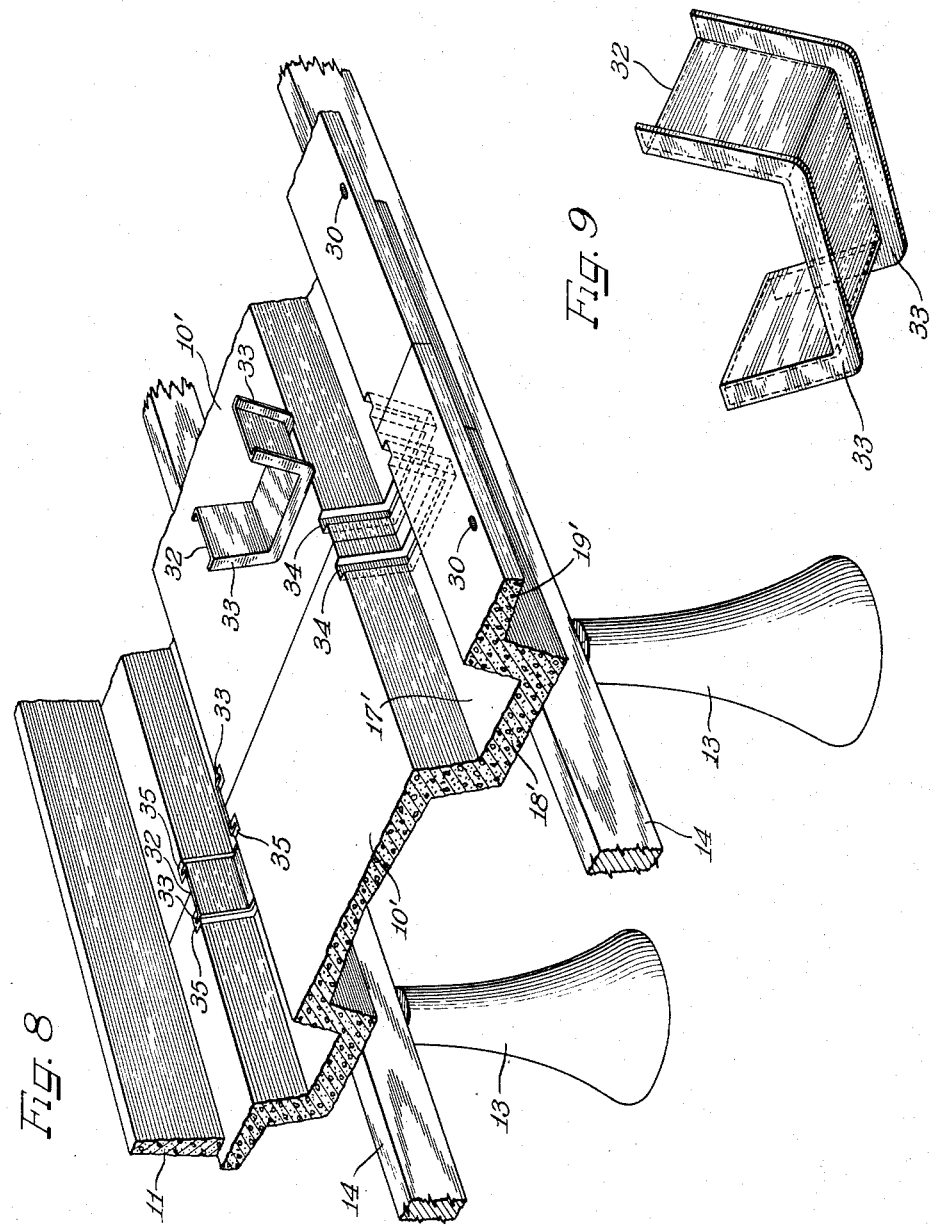
Inventor
Herbert W. Schroeder
by      Attys Patented May 19, 1953

2,638,715

UNITED STATES PATENT OFFICE 2,638,715

GREENHOUSE BENCH STRUCTURE

Herbert W. Schroeder, Palatine, Ill.

Application August 17, 1948, Serial No. 44,667

14 Claims. (Cl. 47—18)

The present invention relates to improvements in greenhouse bench structures and more particularly relates to a structure of this type wherein subsoil irrigation is practiced.

Conventional greenhouse benches consist of elongated wooden or monolithic concrete trays which must be erected as complete units on the site. That is, the entire space for the bench unit must be evacuated and the entire bench is then constructed in the exact location in which it is to be used, the wooden benches being constructed board by board and the concrete benches being poured in molds erected to support the cement slurry until it has hardened sufficiently to remove the mold. This obviously takes considerable time and the space in which a bench is being constructed is tied up for the duration of the construction and in the case of a concrete bench until the same has set sufficiently to be used. In addition considerable auxiliary space is required for the equipment and materials involved in the construction operation.

Monolithic cement greenhouse benches are subject to the disadvantage that during sterilization with live steam expansion stresses all too frequently cause bad cracks and breaks resulting in premature deterioration and failure, and undesirable leakage, especially where subsoil irrigation is practiced.

A further disadvantage inherent in prior greenhouse benches and more particularly those in which subsoil irrigation is practiced is that uneven distribution of the water results in "blind" areas where the water does not adequately reach and these must be watered by hand from the surface.

An important object of the present invention is to provide a greenhouse bench structure which can be prefabricated and erected at the site of use in an extremely short time so that by proper timing a new bench can be installed between planting periods and the installation completed without tying up the space for an unproductive or delaying period.

Another object of the invention is to provide a precast concrete greenhouse bench comprising a novel arrangement of relatively small size, easily handled and quickly assembled units.

A further object of the invention is to provide a concrete greenhouse bench construction embodying facilities for subsoil irrigation and in which excess water is automatically drained and proper moisture conditions will prevail throughout the soil bed.

Yet another object of the invention is to provide in a green house bench a novel, efficient subsoil irrigation system.

Still another object of the invention is to provide a concrete greenhouse bench which is provided with a novel arrangement for avoiding damage from expansion stresses.

It is also an object of the invention to provide a concrete greenhouse bench in which small individual sections are readily replaceable.

An additional object of the invention is to provide a novel greenhouse bench construction which can be readily disassembled and reassembled at a different site as desired.

Other objects, features and advantages of the present invention will be readily apparent from the following detailed description of a preferred embodiment thereof taken in conjunction with the accompanying two sheets of drawings, in which:

Figure 1 is a fragmentary perspective view of a greenhouse bench embodying the features of the invention;

Figure 2 is a perspective view of a connector member used in assembling the bottom components of the greenhouse bench;

Figure 3 is a bottom perspective view of one of the bottom components of the greenhouse bench;

Figure 4 is a transverse enlarged scale sectional view through the greenhouse bench assembly taken substantially on the line IV—IV of Fig. 1;

Figure 5 is a fragmentary detail sectional view taken substantially on the line V—V of Fig. 4;

Figure 6 is an elevational detail view partially broken away and in section and taken substantially as indicated by the line VI—VI of Fig. 4;

Figure 7 is a fragmentary plan sectional detail view taken substantially on the line VII—VII of Fig. 6;

Figure 8 is a fragmentary sectional perspective view of a slightly modified form of the invention; and Figure 9 is a bottom perspective view of a modified connector member used in the form of Fig. 8.

According to the present invention a novel greenhouse bench is provided comprising a prefabricated, readily assembled or disassembled cooperative assembly of individual bottom units 10, side units 11 and end units 12 arranged in the form of an elongated tray within which is supported a suitable planting mixture of any preferred composition appropriate to the growing of selected varieties of plants, the planting bed thus provided being omitted from the present drawings since that is left to the choice of the user and would add nothing to an understanding of the structure involved herein.

To support the bench a more or less conventional carrying frame arrangement may be utilized comprising a series of appropriately spaced legs 13 which may be formed from concrete if desired and which support longitudinally extending bars such as conventional wooden two by fours 14 set on edge.

Each of the bottom members 10 is preferably formed as a precast concrete section of a size to be conveniently handled but large enough and of adequate weight and strength to withstand rigorous usage. To this end the precast unitary section 10 is formed as an elongated rectangular monolith of reinforced concrete structure, the reinforcement being provided by means such as wire mesh 15 (Fig. 4). Elongation of the precast unit or slab 10 is transverse to the bench in which it is eventually installed so that the length of the unit will determine the eventual width of the bench. Thus, in assembly the bottom units 10 are placed in abutment at their longitudinal edges, and the total length of the bench is determined by the number of units 10 employed in edgewise abutment.

Provisions are made for subsoil irrigation in a uniform practical manner. To this end, each of the bottom units 10 is formed with a pair of preferably identical water channels or troughs 17 disposed to extend transversely to the respective unit adjacent to the respective opposite ends of the unit. These water trough channels 17 are formed preferably by providing the slab unit 10 with a pair of parallel downwardly projecting ribs 18 of appropriate width, with the walls thereof preferably diverging from the bottom of the trough which is preferably flat substantially as shown. Intermediate the water channel or trough ribs 18 the unit 10 is preferably formed with a more or less flat slab arch 19. Beyond each of the ribs 18 and in a plane with the arch 19 is an end flange 20. In assembly, the individual water troughs 17 are aligned to provide a continuous water trough throughout the length of the bench at each side of the bench.

In order to assure thorough uniform distribution of water throughout the planting bed afforded by the bench, means are provided, herein in the form of a half section drain tile duct 21 in each of the troughs 17 for assuring uniform distribution of water longitudinally throughout each of the troughs although supplied at perhaps one or more points to the troughs as by means of inlet hose or pipe 22 which extend from above the maximum elevation of the planting bed down into the ducts 21 in respective troughs 17. Although shown herein as provided at one end of each of the troughs, the inlet pipes or ducts 22 may be disposed at the longitudinal center of the duct 21 or at any other point as desired. The distribution duct 21 in each instance may comprise an aligned series of halves of porous drain tile 23 laid to arch over the bottom of the trough 17 in which placed. Through this arrangement, the half-duct 21 keeps the enclosed portion of the bottom of the respective water trough 17 clear of the superposed planting bed, but water can seep from the half-duct into the uncovered portion of the trough, the divergent walls of which and the depth of which afford a substantial trough area for reception and distribution of the irrigating water to the superjacent subsoil for capillary permeation of the entire plant bed. If desired the troughs and even the bench surfaces provided by the arch 19 and the flanges 20 may be filled and covered with gravel to assure more thorough, rapid and uniform permeation of the subsoil with the irrigating water. This also promotes drainage of excess water. By reason of the plurality of irrigation troughs 17, every portion of the planting bed is superjacent efficiently to subsoil irrigation and rarely will any portion of the planting bed be inadequately provided with moisture and require surface irrigation. Accordingly, packing of the soil surface due to surface watering and consequent necessity for cultivation between plantings is eliminated by use of the present greenhouse bench.

Automatic drainage of the bench is provided for. To this end the joints between the bench sections 10 are left unsealed throughout their major extent. Thereby, excess water can drain down through the joints and escape from the bench. Inasmuch as these joints come at regular relatively close intervals quite adequate drainage is afforded and there will never be any danger of excess moisture remaining in the planting bed.

Sealing of the joints between the aligned irrigation trough ribs 18 against loss of irrigation water is, of course, necessary and this is effected in the present instance in a novel manner in order not only to effect a thorough liquid tight joint seal but also to permit a certain amount of relative movement between the adjacent bench sections 10 as may be necessitated by expansion during steam sterilization. This is accomplished by surface sealing the irrigation trough joints with caulking compound or asphalt mastic or the like 24 (Fig. 5) and preferably held in place by means such as respective retainers 25 (Figs. 1 and 2). Herein the retainers 25 are of substantially boat-like configuration and standardized as to form. They may be made of any preferred material but in a practical construction comprise appropriate non-corrosive metal castings or stampings of generally U-shape angular form to fit about the outside surfaces of the adjacent respective ribs 18 at the trough joints. In this manner the sealing medium 24 is held in place about the outer edges of the joints and at the same time the retainers 25 hold the bench sections 10 in proper longitudinal alignment.

Further retention of the sealing material 24 is accomplished and retention of the sections 10 against separation longitudinally of the bench accrues from having the retainers 25 formed with longitudinal edge flanges 27 adapted to be received in appropriate transverse channels 28 formed in the outer faces of the ribs 18 parallel to and slightly spaced from the ends of the ribs. The channel grooves 28 are preferably slightly deeper than the width of the flanges 27 and are of ample width to afford free clearance for reception of the flanges 27 in assembly, the excess space being filled with the plastic sealing material 24. Through this arrangement substantial assembly tolerance is afforded and substantial clearance and tolerance for accommodating expansion and contraction relative movement between the sections 10 or the sections 10 and the metallic retainers 25. The flanges 27 cooperating within the grooves 28 hold the sections 10 against any appreciable separation longitudinally of the bench. This arrangement, it will be apparent from Figs. 1 and 4, in particular, seals merely the joints between the ends of the ribs 18, leaving all of the remainder of the joints between the bench sections 10 unsealed and thus sectional shape of the trough 17' into which it is to be fitted. The longitudinal margins of the body are formed with respective angularly extending flanges 33 which afford the retainer an inverted U-shaped or trough formation with the flanges 33 extending generally downwardly so as to be received in respective grooves or channels 34 formed transversely in the trough portion of the rib 18' adjacent to and in spaced parallel relation to the respective opposite ends of the section of the channel or trough 17' in each of the bench sections 10'. The width of the retainer members and thus spacing between the depending flanges 33 is preferably equal to approximately the spacing between the longitudinal median planes of the grooves 34, and the grooves 34 are preferably at least slightly deeper than the width of the flanges 33.

In assembly, the grooves 34 are filled with plastic water sealing material 35, both in the horizontal or base portions of the grooves and in the side or upwardly extending portions of the grooves. Then the respective retainer members 32 are pressed downwardly until the flanges 33 are thoroughly embedded in the plastic sealing material 35 and the body or web portion of the respective retaining member is substantially in engagement with the joint portions of the contiguous bench sections 10' between the adjacent sealing grooves 34. This effects a thoroughly water sealed joint between the sections, permitting a reasonable amount of relative shrinkage or expansion movement of the parts without breaking the seal. The retaining and sealing members 32 may easily be pried free when it is desired to dismantle the assembly for any purpose. The joints between the sections 10', except where they are sealed by the interaction of the retaining and sealing members 32 and the sealing material 35, are preferably left unsealed so as to afford excess moisture drainage facility.

The remaining features of the modified greenhouse bench of Figure 8 are preferably substantially the same as described in connection with Figure 1, the sides of the bench being completed by the side wall slabs 11, and flanges 19' of the bench sections 10' having the oval shaped sockets 30 for receiving the pins by which the sides 11 are connected.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a prefabricated greenhouse bench structure, bottom members comprising elongated prefabricated sections having a transverse irrigation trough therein, the sections being joined together in edge to edge relation with the irrigation troughs in alignment to form a continuous trough, means providing sides and ends for the bench rising from the respective margins of the bottom sections, a half-duct formed from aligned loose jointed half drain tile laid to arch over the bottom of the trough, and a water inlet extending up from the duct above the maximum planting bed surface to be supported by the bench.

2. In combination in a greenhouse bench, a series of transversely elongated edgewise abutting prefabricated bottom sections each of which has a spaced parallel pair of subsoil irrigation troughs therein and with the troughs of all of the sections aligned to provide parallel continuous subsoil irrigation troughs, means for delivering water to the troughs from above the surface of a planting bed to be supported by the cooperating bottom sections, and means providing removable sides upstanding from the margins of the bottom sections.

3. In combination in a greenhouse bench construction, a cooperating series of transversely elongated edge-to-edge abutting prefabricated bottom sections each of which has a downwardly projecting rib providing an upwardly opening subsoil irrigation trough transverse thereto and with all of the troughs of the sections aligned to provide a continuous subsoil irrigation trough throughout the length of the bench, and means for supporting the joined sections.

4. In a greenhouse bench construction, a bottom structure comprising a series of prefabricated units joined together in edge-to-edge relation, each of the sections having a subsoil irrigation trough therein cooperating with the troughs of adjacent sections to provide a continuous subsoil irrigation trough, and means for sealing the trough joints while leaving all of the remainder of the joints between sections free for drainage therethrough of excess subsoil irrigation moisture.

5. In combination in a greenhouse bench, a bottom structure comprising prefabricated sections joined edge-to-edge, said sections having depending ribs arranged in alignment to provide a continuous rib and defining upwardly opening subsoil irrigation troughs which are aligned into a common trough, and generally U-shaped retainers connecting adjacent rib joints and having moisture sealing material therein for sealing the rib joints.

6. In combination in a greenhouse bench construction, edgewise cooperating bottom sections each of which has a downwardly extending rib defining an upward opening subsoil irrigation trough, the ribs being provided adjacent to the junctures thereof with grooves parallel to the junctures, and retaining members spanning the junctures and having flanges extending into said grooves.

7. In combination in a greenhouse bench construction, a bottom structure comprising edge-to-edge abutting transversely extending prefabricated bottom sections each of which has a spaced parallel pair of depending ribs defining upwardly opening subsoil irrigation troughs, connecting members at the junctures of said ribs of the sections and underlying the junctures, and supporting frame members underlying the ribs and with the connecting members resting thereon.

8. In a greenhouse bench structure, a bottom section prefabricated slab elongated in form and of rectangular outline, said slab having a transverse depression forming a subsoil irrigation trough, the slab extending to opposite sides beyond said trough and providing substantial supporting area and being adapted to be joined in edge-to-edge relation with adjacent similar slabs with the subsoil irrigation troughs therein in alignment, the slab having connector grooves extending parallel to and spaced from the ends of the portion thereof forming the subsoil irrigation trough.

9. In a prefabricated greenhouse bench structure, a connector member of substantial width to span across a joint of aligned trough-ribs of a pair of bench sections and of generally U-shape affording drainage slits which, to be sure, are fairly close so as to retain the contents of planting bed on the bench but are nevertheless effectual for drainage of excess moisture.

The side members 11 are preferably also of precast concrete construction and are formed in lengths which can be conveniently handled. As shown each of the side members 11 comprises a vertical bar-like structure which is preferably slightly thickened toward one edge which in assembly provides the bottom edge which will rest upon the outer upper margin of the end flanges 20 of contiguous bench sections 10, the length of the side members 11 being shown as equaling three of the sections 10 in assembly. The assembled relation of each of the side members with the supporting bench sections 10 is preferably such as to facilitate ready assembly and disassembly and in the present instance is shown as comprising a pin and socket connection, each of the side members 11 having a spaced series of pins 29 embedded therein and protruding from the bottom edge thereof and arranged to be received in respective appropriate sockets 30 formed in the margins of the flanges 20. For example, there may be one connecting pin for each of the sections 10 across which the side member 11 extends in assembly. As best seen in Figs. 6 and 7, the sockets 30 are preferably in the form of oval shaped metal sleeves embedded in and carried by and opening through the respective flanges 20, with the major transverse dimension parallel to the adjacent end edge of the bench section 10 so as to afford assembly and expansion tolerance for the pin and socket assembly longitudinally of the bench.

By preference the joints between the lower edges of the side members 11 and the contiguous marginal surfaces of the flanges 20 across which the side members extend and upon which they are supported are left unsealed. Moreover the abutting end edges of the side members 11 are left unsealed whereby to supplement the drainage joints afforded between the bench sections 10.

Each end of the finished bench has one of the end members 12 which are also preferably of precast concrete structure in slab form similar to the side members 11 and arranged to be assembled upon the margin of the respective endmost bench section 10, with the ends engaging the contiguous end margins of the endmost side members 11. In order to close off the ends of the irrigation troughs 17, the end member 12 is preferably formed with complementary shaped downwardly extending closure flange portions 31. One of the retaining members 25 affords a liquid seal between each of the ribs 18 and the contiguous closure flange 31 similarly as at the joints between the sections 10.

In assembling a greenhouse bench embodying the features of the present invention, all that need be done is to erect the frame comprising the legs 13 and the supporting horizontal parallel frame bars 14, with the upper surfaces of the frame bars 14 as nearly as practicable perfectly horizontal, or with any desired predetermined slope in a longitudinal direction. Thereupon, the predetermined series of bench sections 10 can be quickly assembled upon the supporting frame with the connecting members 25 at the irrigation trough joints and the supporting frame bars or rails 14 underlying the connecting members. Moisture sealing of the irrigation trough joints is very quickly effected by merely filling each of the substantially boat-shaped retaining members 25 with the sealing compound 24 in plastic condition and then assembling the same at the irrigation trough joints and pushing the bench sections 10 downwardly into the retaining members to cause the sealing material 24 to squeeze sealingly into the joint and with the excess squeezing over into the channels 28. After the base of the bench has been completed, the water distributing duct tiles 23 are laid in place to arch over the bottoms of the respective irrigation troughs 17 and provide the water distributing half-ducts 21. Then the bench is completed by lifting into place the side members 11 and the end members 12. Substrata drainage gravel sand or the like, and superstrata of soil are then filled into the completed greenhouse bench or tray and leveled off and tamped and the planting bed thus provided then uniformly irrigated by running water down the inlets 22, either before or after planting as preferred. When excess irrigation water begins to drip from the various drainage joints, supply of water can be discontinued. A decided advantage of the subsoil irrigation practiced with the greenhouse bench of the present invention resides in that while the water is being introduced into the subsoil irrigation system no attention is required to the installation but the attendant may go about other business. From time to time while the bench is in use water can be introduced in similar fashion as required.

Should it become necessary to disinfect the bench by the usual live steam disinfecting process, that can be readily accomplished not only by the shroud method of enclosing the top of the bench and introducing live steam onto the surface of the soil bed but also by introducing the steam into the irrigation ducts 21 by way of the inlets 22. Danger of expansion stresses damaging any of the components of the bench is minimized by reason of the relatively small units of which the components are comprised. Another desirable factor in this regard is that the components are relatively loosely assembled, that is they are permitted a fair range of relative expansion and contraction movement, while nevertheless being held together effectually for practical purposes.

In the course of change of plantings it may become necessary to cultivate the soil bed and this can be very easily accomplished by means of a rotary cultivator or tiller directed over the surface since the soil bed can be of uniform depth, and there are no obstructions intermediate the sides or ends of the bench.

In the modification shown in Figs. 8 and 9, all features of the greenhouse bench structure may be the same as in the form which has just been described, except that the joint connectors or retainers instead of being applied to the undersides of the bench ribs, are applied inside the channels provided by the ribs. To this end, precast bench sections 10' are supported by means such as the legs and longitudinal bars 14 but with ribs 18' of the bench sections directly supported upon the bars 14. In assembling the bench sections 10', they are aligned end to end on the supporting frame with their adjoining edges close together. The joint sealing between irrigation troughs 17' is effected by means of respective connectors or retainers 32. Each of these retainers may be made of appropriate noncorrosing or treated metal, plastic material or the like and comprises a body of generally U-shaped cross-section complementary to the crossboth longitudinally and transversely, the body of the member being generally complementary in shape to the trough rib joint surfaces and having relatively narrow side flanges to extend into sealing grooves in the trough ribs.

10. In combination in a greenhouse bench, a supporting structure, a series of prefabricated sections assembled together and supported on said supporting structure in mutually cooperative relation with the edges of contiguous sections joining and thereby providing a tray assembly for receiving a plant bed, each of said sections being formed as a precast concrete slab and having respective grooves in its margins in closely spaced relation to and alongside the joining edges thereof, and generally U-shaped connectors between the joining edges of contiguous slabs and having flanges in said grooves.

11. In combination in a greenhouse bench, a supporting structure, a series of prefabricated sections assembled together and supported on said supporting structure in mutually cooperative relation and providing a tray assembly for receiving a plant bed, each of said sections being formed as a precast concrete slab and having respective grooves in the upper side of the margins thereof in closely spaced relation to the joining edges of the slabs, and generally U-shaped connectors between the joining edges of contiguous slabs and having flanges in said grooves.

12. In combination in a greenhouse bench, a supporting structure, a series of prefabricated sections assembled together and supported on said supporting structure in mutually cooperative relation and providing a tray assembly for receiving a plant bed, each of said sections being formed as a precast concrete slab and having respective grooves in the lower side of the margins thereof in closely spaced relation to the joining edges of the slabs, and generally U-shaped connectors between the joining edges of contiguous slabs and having flanges in said grooves.

13. In a greenhouse bench structure, a prefabricated bottom section member comprising a body having opposite edges cooperable with the edges of similar members to provide a greenhouse bench, the central portion of said body between said edges comprising a downwardly opening arch defined at respectively opposite sides by downwardly directed ribs of substantial width providing upwardly opening subsoil irrigation troughs opening through said opposite edges so as to be cooperable with similar troughs of adjoining bottom members to afford continuous subsoil irrigation troughs along the sides of the resulting greenhouse bench structure, said body having laterally projecting flanges at the outer sides of the troughs therein.

14. In a greenhouse bench structure, a prefabricated bottom section member comprising a body having opposite sides cooperable with the edges of similar members to provide a greenhouse bench, the central portion of said body between said edges comprising a downwardly opening arch defined at respectively opposite sides by downwardly directed ribs of substantial width providing upwardly opening subsoil irrigation troughs opening through said opposite edges so as to be cooperable with similar troughs of adjoining bottom members to afford continuous subsoil irrigation troughs along the sides of the resulting greenhouse bench structure.

HERBERT W. SCHROEDER.

References Cited in the file of this patent

UNITED STATES PATENTS

| Number | Name | Date |
| --- | --- | --- |
| 784,756 | Pult | Mar. 14, 1905 |
| 923,921 | Wise | June 8, 1909 |
| 974,685 | McCaslin | Nov. 1, 1910 |
| 1,176,306 | Levis | Mar. 21, 1916 |
| 1,983,806 | Norman | Dec. 11, 1934 |
| 2,015,924 | De Lhorbe | Oct. 1, 1935 |

FOREIGN PATENTS

| Number | Country | Date |
| --- | --- | --- |
| 504,333 | Great Britain | Apr. 24, 1939 |